United States Patent Office 2,730,875
Patented Jan. 17, 1956

2,730,875

PROCESS OF OPERATING REGENERATOR PAIRS IN GAS SEPARATING INSTALLATIONS

Fritz Ranke, Pullach, near Munich, Germany, assignor to Gesellschaft fuer Linde's Eismaschinen Aktien-Gesellschaft, Hoellriegelskreuth, near Munich, Germany Application November 7, 1951, Serial No. 255,158

Claims priority, application Germany December 21, 1950

2 Claims. (Cl. 62—175.5)

This invention relates to a process and an apparatus for the separation of gas mixtures.

In plants, where gas mixtures are separated by application of pressure and cold, it is customary to use regenerators in replacement of countercurrent flow devices. These regenerators are always operated in pairs.

The gas mixture is conducted through the one regenerator of a pair of regenerators, which has previously been "blown cold" by a separation product of said gas mixture and the latter is thereby cooled.

Contemporaneously, a separation product of the gas mixture is conducted in an opposite direction through the second regenerator which is thereby cooled. If the one regenerator has been blown "cold" and its temperature has been reduced at a desired rate and the previously cold regenerator has been blown "hot" and its temperature raised at a predetermined rate, the two gas flows are changed-over from the one to the other regenerator. The cold separation product is now flown through the regenerator previously passed by the warm gas mixture; correspondingly, the warm gas mixture flows through the regenerator which has been previously passed by a cold separation product.

The regenerators, therefore, represent heat exchangers which are alternatingly passed by the gas mixture to be separated and a separation product thereof; the end portion of the regenerators directed towards the atmosphere is always warm, whereas the opposite end portion remains cold; the temperature in the regenerators varies at a certain amount.

The time period within which the flow exchange in the two regenerators is performed depends primarily upon the heat capacity of the regenerators and upon the velocity of the gas flown. The heat capacity of the regenerators is influenced by the filler mass. It is customary to fill the separators with rolled-up metal bands or mineral materials, such as stones and the like.

In gas separating installations of this generally known type where the heat exchange between the gas mixture and its components resulting from the separation is carried out in the above described pairs of regenerators, the problem often arises to distribute the gas in such a manner to the individual regenerators, that in the individual regenerators equal temperature conditions exist during the exchange of heat. During the cooling of the crude gas the impurities contained therein, such as water vapor and carbon dioxide are deposited in solid form on the filler material of the regenerators. These deposits are removed during the next switching or change-over period of the two regenerators by a component of the separated gas mixture. For this purpose it is important that the perautre of the gas mixture and of the separated component leaving the regenerator does not differ too greatly. If the temperature of the hot end of the regenerator after having been cooled differs essentially from the temperature of the same end after having been heated, the evaporation of the condensed water will be unsatisfactory. Moreover, a loss of cold is caused, since the quantity of cold which is disposeable for the cooling of the gas mixture in the regenerator is proportional to the difference of temperature at which the regenerator may be cooled. On the other hand and if the temperature difference is too large at the cold end of the regenerator, the deposited carbon dioxide cannot be completely evaporated and consequently causes a reduction of the cross section. These difficulties can only be eliminated when the relationship between the quantity of the incoming crude gas and of the outgoing separation products is very accurately maintained and this not only in the entire group of regenerators but also in each individual regenerator.

A very sensitive criterion for the proper distribution of these gas quantities is the temperature, which exists in the interior of a regenerator and which may be measured at any desired place of the regenerator, which, however, should not be too close to either end. During each change-over period, the temperature increases and decreases once along an approximately linear curve and its mean value or a value corresponding to a predetermined time within each change-over period is the same in the state of inertia.

As soon as the ratio of the amount of the entering to the outgoing gas changes at a small ratio, this mean value varies appreciably. If, for example, the amount of the incoming fresh gas increases, while the amount of the remainder of the gas remains unchanged, the mean value increases and vice versa. Particularly, in the case of a pair of regenerators this reference temperature is only equal, at two corresponding places if the ratios of the amounts of gases flowing in the two regenerators are equal. The same applies to two or more pairs of regenerators, provided these pairs are operated at the same conditions.

It is accordingly an object of this invention to provide an improved process of and apparatus for operating one or more pairs of regenerators in a gas separation plant.

A further object of the invention is to provide an operating process for the regenerators of a gas separating installation, where the deviations of the mean temperature of each regenerator from the mean temperature of the entire group of regenerators caused by accidental or systematic disturbances are automatically controlled by a change of the distribution of the gases between the regenerators.

In accordance with the invention these objects are complied with by automatically controlling the time of the change over of each pair of regenerators if a single pair of regenerators is provided, or by automatically controlling the time of the change over and the distribution of the amount of crude gas between the individual pairs of regenerators, if several pairs of regenerators are used. The automatic control of the amount of gas to be distributed between the individual pairs of regenerators is known per se; however, the automatic control of the change over instants alone or in combination with the automatic control of the amount of gas is new. Only in this manner can the control be made completely automatic for every operating condition and such procedure therefore provides the full advantage of automatic control. The change or variation of the gas distribution is effected either by a change of the time periods or length of time of the gas flows through each regenerator or by a change of the amount of gas per unit of time, which is fed to each pair of regenerators.

In accordance with the invention two individual regenerators are directly compared with each other or two pairs of regenerators are compared between which a change of the gas distribution may easily be effected. A pair of regenerators consists of two regenerators operated in phase opposition, that is, the same type of gas flows through each regenerator during cooling. The temperatures of the two regenerators or pairs of regenerators are compared directly or measured simultaneously and the ratio or the difference of the two temperatures is obtained electrically. Depending upon whether at the instant, where the measurement takes place, the temperature of one unit is larger than, equal to or smaller than that of the other unit, the ratio has a value larger than, equal to or smaller than unity and the temperature difference has a positive or negative value respectively. The manner in which the measuring result is utilized to control the distribution of the gas and hence to control the temperature will subsequently be described by way of example for an air separation installation having two regenerators for nitrogen and two regenerators for oxygen.

The invention is illustrated by way of example in the accompanying drawings in which.

Figure 1:
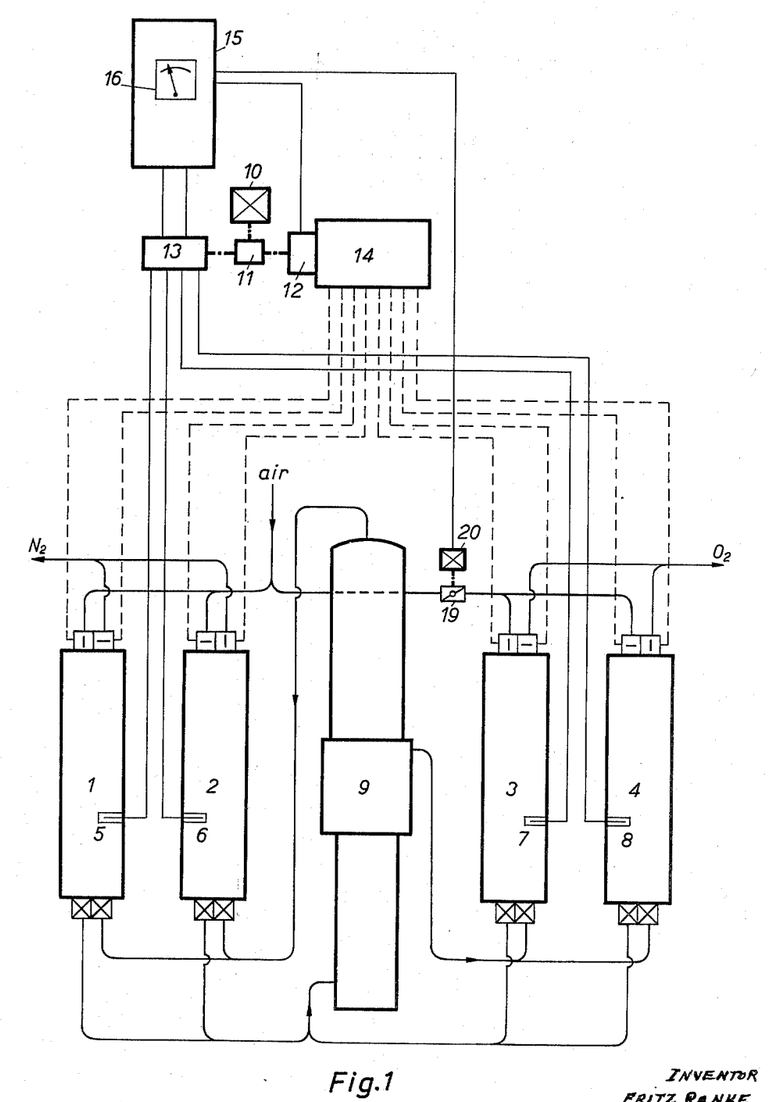
Fig. 1 is a schematic diagram of an air separation installation embodying the present invention.
Figure 11:
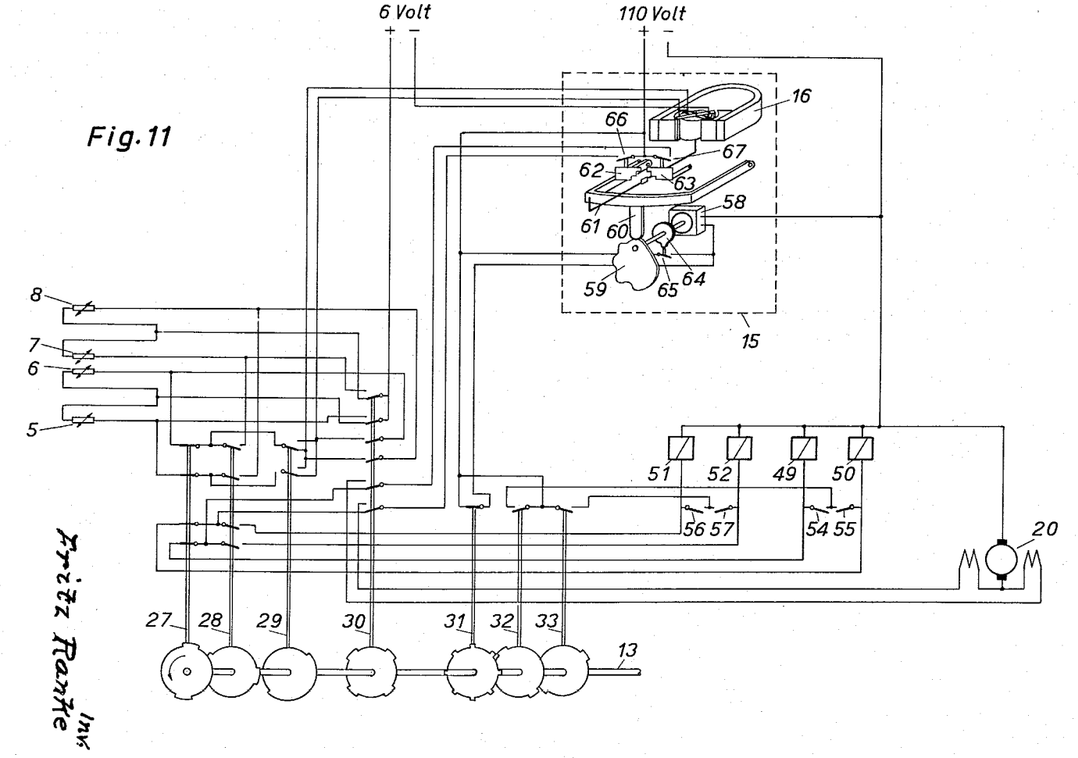
Fig. 11 is a wiring diagram of the embodiment of the previous views utilizing a chopper-bar controller.

Referring now to the drawings, wherein like elements are designated by the same reference characters, and particularly to Fig. 1, there is illustrated an air separation installation consisting of the separating tower 9, two regenerators 1, 2, alternatingly passed by the gas mixture and nitrogen and two regenerators 3, 4, alternatingly passed by the gas mixture and oxygen. In the interior of each regenerator there is disposed a temperature feeler or element such, for instance, as a resistance thermometer 5, 6, 7 and 8, which has such a small heat inertia that it may follow without any appreciable delay the timely variation of the temperatures of the regenerators. The actuation of the valve located at the warm end of the regenerators, is carried out by means of compressed air, and is controlled by means of the switching drum 14, namely the parts 14a and 14b; this actuation is necessary for the switching or reversal of the regenerators. The switching drums 14 are driven from the motor 10 (Fig. 9) by means of a transmission gearing 11 and by a control device 12 (Fig. 11). A further switching drum 13 (Fig. 9), which is provided with electric contact terminals such as the terminals 27 shown in Fig. 9, interconnects the resistance thermometers 5—8 in time staggered sequence with a measuring instrument, such as a cross-coil movement, 16, that is disposed in a regulator housing 15. Before proceeding further with the description and operation of the aforementioned parts, there will be explained the curve of the temperature in the generators in relation to the passage of time.

*Temperature curves*

Figure 2:
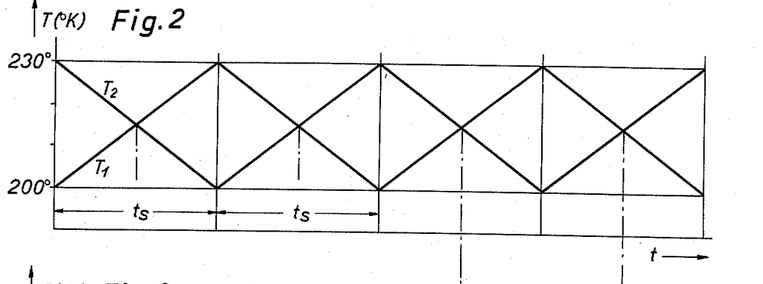
Figs. 2 to 5 are graphs illustrating temperatures of certain regenerators as a function of time which will be referred to in explaining the operation of the invention.
Figure 3:
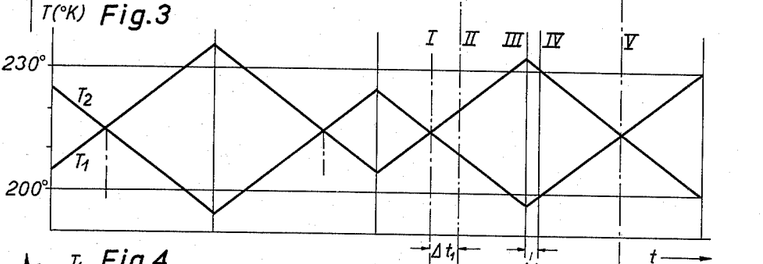

In Figs. 2 and 3, there are shown graphs of temperature plotted over time, in connection with two regenerators, for instance regenerators 1 and 2; these graphs represent temperature values, as measured by the resistance thermometers 5 and 6, in dependency of the passage of time. $T_1$ designates the temperature of the regenerator 1, and $T_2$ is the temperature of the regenerator 2. In accordance with the applicable theory, and measurements, the increase and decrease of the temperatures with time are substantially linear if the measurement is, as in the instant case, taken not too near the ends of the regenerators.

In Fig. 2 there is illustrated the normal operating condition, whereas the curves of the two regenerators are equal to each other, but shifted with respect to each other by a time phase difference $t_s$; this phase difference $t_s$ occurs, because both regenerators alternately are passed by heated air causing the rising branch of the curve, and cooling nitrogen causing the falling branch of the curve. When the mean temperatures of the two regenerators are the same, the curve may for instance have the shape illustrated in the left hand portion of Fig. 3; here the temperature curves remain the same, but they do not have the same height.

For compensating the temperatures with respect to each other, there is used a shifting of the instant of switching or reversing between the regenerators. This is carried out of by means of a mechanism, described below, which permits rotation of the switching drums 14 against their normal position in such a manner that the switching between the regenerators takes place either before or after the normal instant, in accordance with an adjustable time interval; for instance, at the instant III, the switching may occur, which instant is moved ahead for a time interval delta $t_2$ before the normal instant. By this arrangement, the regenerator 1, which is too hot, is heated for a shorter time and cooled for a longer time, while conversely the regenerator 2, which is not too cool, will be heated for a longer time and cooled for a shorter time. By properly selecting the magnitude and direction of the temperature differential delta $t_2$, there is obtained that the temperature curve after the switching at the instant III is again normal, as shown in Fig. 3, so that both mean temperatures will be equal again at the instant V. This control method has heretofore been carried out only manually by the operator, by reading of the temperature off instrument dials, and by comparison of the temperatures an estimate was made of the required extent of application of control measures.

By shifting the instant of switching, the temperature differentials between two cooperating regenerators may be removed. Generally, such a gas separating installation includes two pairs of regenerators, for instance, in installations for the separation of the components of air, one pair of regenerators, provided for the heat exchange of the air and nitrogen, and another pair for that of the air and oxygen.

Figure 5:
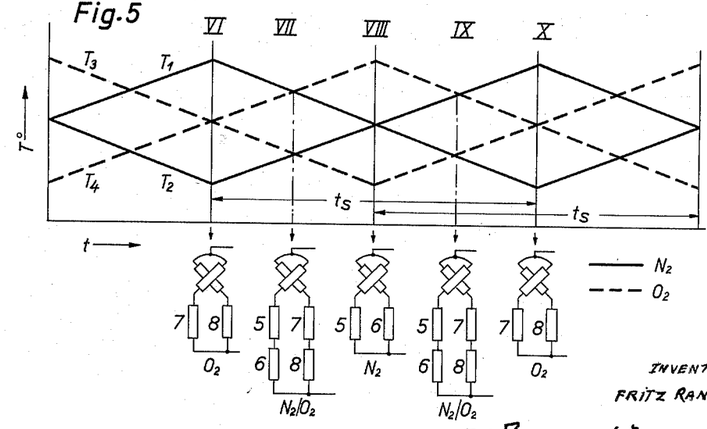

The temperature curve for the temperatures $T_1$, $T_2$, $T_3$ and $T_4$ of these regenerators 1 and 2, 3 and 4 in dependency of time passage is illustrated in Fig. 5. As apparent from Fig. 5 the switching of the nitrogen regenerators and of the oxygen regenerators does not occur at the same instant, but the instants of switching are shifted for a time phase difference $t_s$. The oxygen regenerators are not affected by the switching of the nitrogen regenerators, and likewise the nitrogen regenerators are not affected by the switching of the oxygen regenerators. It is therefore possible, by shifting the switching instants VI or X, to bring both nitrogen regenerators to the same temperature, without affecting the oxygen regenerators; conversely, by changing the instant VIII, the oxygen regenerators may be brought to the same temperature without affecting the nitrogen regenerators.

There remains to bring to the same value the mean temperatures of both pairs of regenerators. For this purpose, there is provided in the fresh gas feed of the oxygen regenerators a throttle valve 19 (Fig. 1), by means of which the apportioning of the air of both pairs of regenerators can be controlled when the throttle valve is moved towards the open position, the volume of air fed to the oxygen regenerators is increased, while conversely the volume of air fed to the nitrogen regenerators is reduced; this causes an increase in the temperatures of the pairs of oxygen regenerators, and a commensurate reduction of the temperatures of the pairs of the nitrogen regenerators.

Conversely, when the throttle valve 19 is moved towards closure, the temperatures of the pair of oxygen regenerators will be reduced, and the temperatures of the pair of nitrogen regenerators increased.

Apparatus

In accordance with the instant invention, the aforedescribed regulating may be carried out automatically.

There will now be described the automatic regulation of the single regenerators of one pair, to equalize the mean temperatures by means of a phase shift of the instant of switching or reversing. This is illustrated schematically in Fig. 1, and in greater detail in Fig. 9.

Figure 12:
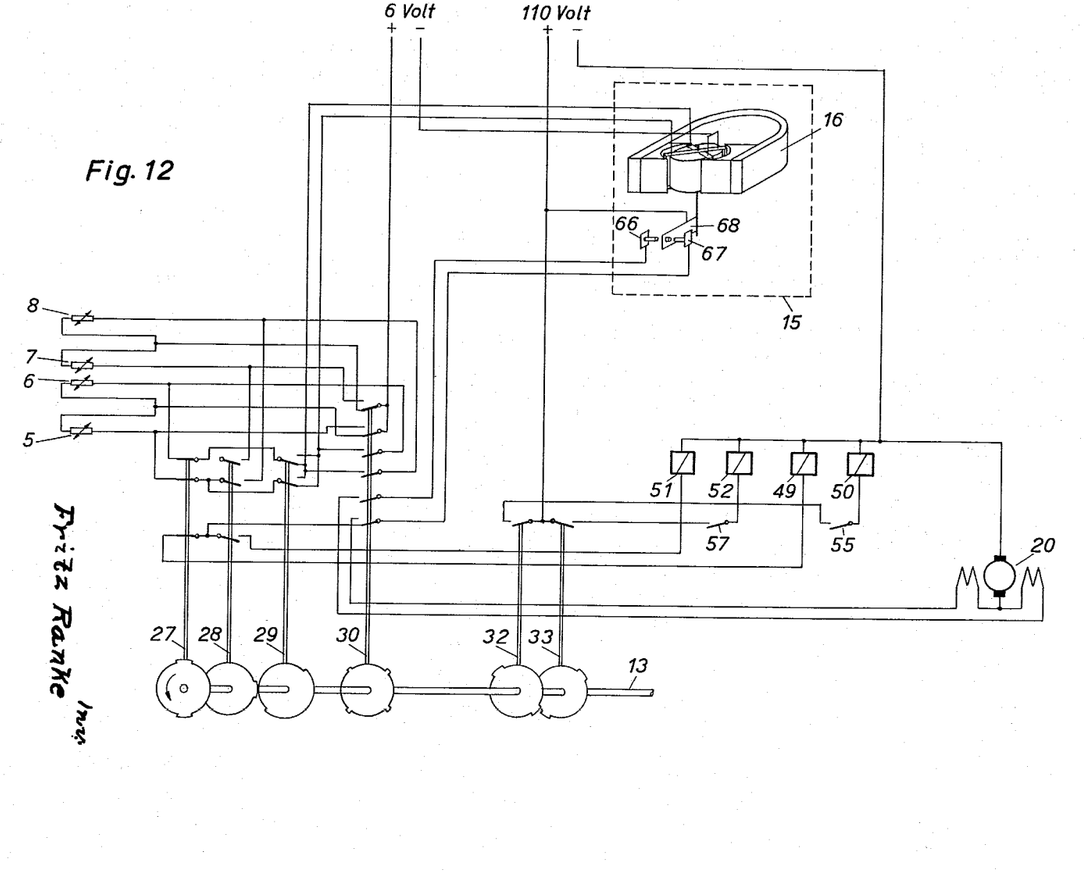
Fig. 12 is a modified wiring diagram, showing the utilization of an instrument with direct contact.

The power generated by the motor 10 is transmitted to the gearing 11 which includes two worm gear wheels, and thence to a main shaft 21. Said main shaft 21 transmits the power, by means of gears 22 and 23, to an auxiliary shaft 24. Said auxiliary shaft 24 drives, by means of gears 25 and 26, the switching drum 13. The transmission ratio is so selected that the drum 13 completes one switching cycle at each full revolution. The drum 13 comprises cams which actuate cam followers that are formed on the contact terminals 27—33; in Fig. 9 a single contact terminal 27 is shown, but the others are shown in Figs. 11 and 12.

Figures 9, 10:
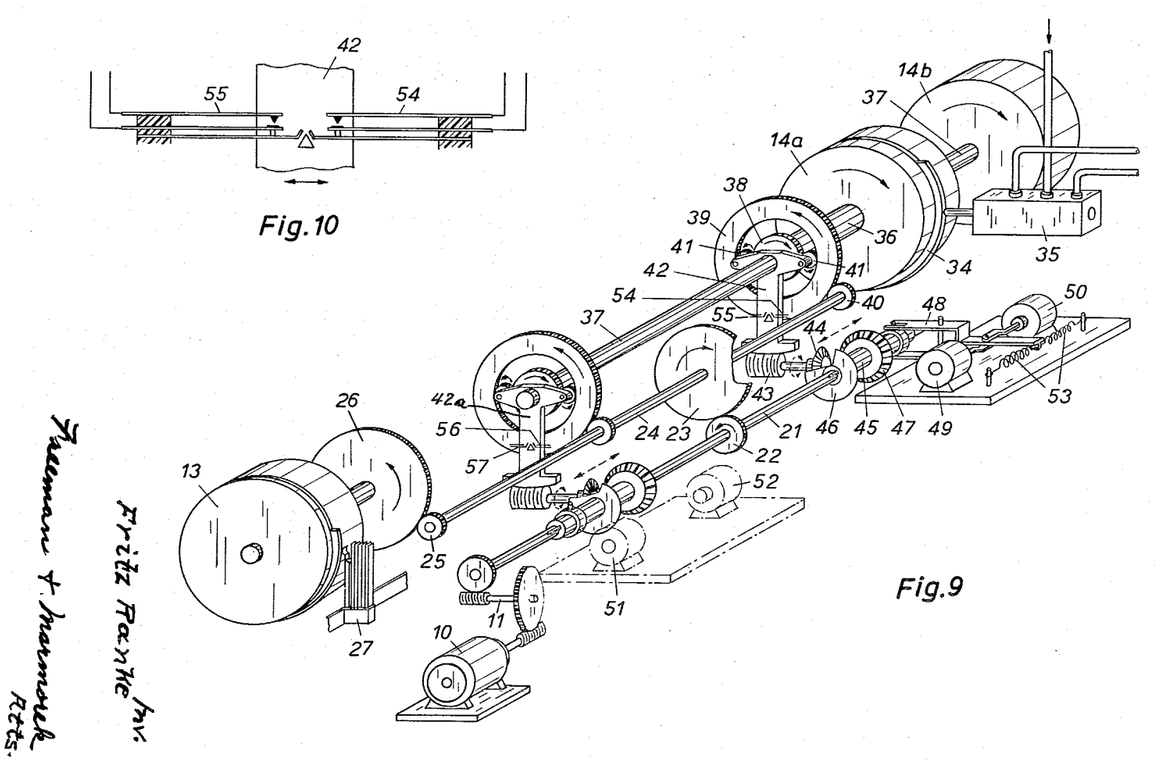
Fig. 9 is a perspective view of the switching drums and the gearing for the automatic control for the instant of switching of the regenerators.
Fig. 10 is a fragmentary sectional view showing two sets of contact terminals that form part of the control features shown in Fig. 9.

The switching drum 14 is composed of two parts, namely the part 14a and the part 14b. The part 14a controls the nitrogen regenerators, while the part 14b controls the oxygen regenerators. On each of the parts 14a and 14b there is provided a set of three dimensional cams 34, corresponding in number to the set of switching valves disposed on the regenerators, and a set of cam followers that operate valve controls 35 for compressed air. For the sake of clarity of illustration, only a single cam 34 and a single valve control 35 are shown in Fig. 9. The control 35 regulates the feed of the compressed air, feeding it to the cylinder of the shifting valve of the regenerators, to effectuate their switching.

The part 14a is driven by a hollow shaft 36, while the part 14b is driven independently of the part 14a by means of a shaft 37 that protrudes through the hollow shaft 36.

There is provided a setting mechanism for the part 14a, which comprises a planetary gearing which includes an inner gear 38 that is secured on the hollow shaft 36, an annular outer gear 39 that is rotatably journalled on the shaft 36 and that is driven by means of a pinion 40 that meshes with an external toothing of an outer gear 39; the pinion 40 is mounted on the shaft 24, and drives the outer gear 39 at a constant speed; said planetary gearing finally includes two planetary gears 41 that transmits the power from the outer gear 39 to the inner gear 38 and thence the power is transmitted to the shaft 36 and to the part 14a. The planetary gears 41 are journalled on a bracket 42 that is freely turnable about the axis on the shaft 37.

When the bracket 42 is turned about the axis of the shaft 37 for an angle, this movement is translated into a rotation of the part 14a, and is superposed on the normal angular movement of that part; the part 14a thus will be subjected to an additional rotational movement superposed on the normal rotation. If the additional movement is in the same direction as the normal rotation, then the switching of the regenerators will be obtained before the normally assigned time; conversely, if the additional movement impaired on the part 14a is opposite to the normal rotation, the said shifting will take place later than at the normally assigned time.

On the bottom of the bracket 42, there is provided a toothed segment with which there meshes a worm 43 that is driven from the shaft 21 by means of a gearing arrangement that includes a bevel gear 44 that is secured on the same shaft as the worm 43, and two oppositely disposed valve gears 46 and 47, respectively, that are both secured on a sleeve 45. The sleeve 45 may be shifted axially on the shaft 21, as shown by the broken line arrow in Fig. 9, to engage alternatively with the gear 44 either the gear 46 or the gear 47; in a central position of the sleeve 45, both of the gears 46 and 47 will be disengaged from the gear 44. The sleeve 45 extends behind the gear 47, and carries opposite pins that are engaged by a fork 48 that extends between two electromagnets 49 and 50. A double acting spring 53 is provided near the free end of the extension of the fork 48 for normally returning the fork 48, and thereby the sleeve 45, to the central position in which the gear 44 is disengaged from either of the gears 46 or 47. Upon actuation of the magnet 49, the gear 46 will be brought in mesh with the gear 44; this engagement causes turning of the bracket 42 in one direction. Conversely, if the magnet 50 is actuated, the fork 48 will move into engagement the gear 47 with the gear 44, and this will cause turning of the bracket 42 in the opposite direction. The angular movement of the bracket 42 controls the off-setting of the instant of switching, and is proportional to the length of time of operation of one of the magnets 49 or 50.

A similar arrangement is made for the part 14b, in which the movement of the bracket 42a is controlled by electromagnets 51 and 52.

In Fig. 11 there is illustrated the mechanism for actuating the magnets 49, 50, 51 and 52, for superposing an additional movement onto the drum 14, namely the parts 14a and 14b thereof.

Figure 6:
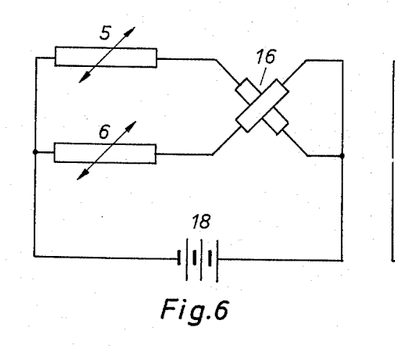
Figs. 6 to 8 are schematic circuit diagrams of circuits for electrically obtaining the ratio or the difference of the measured temperatures.

The resistance thermometers 56, 57 and 58 (Fig. 4) that measure the regenerator temperatures are being compared by a cross-coil movement generally designated 16 of well known design. As familiar to the artisan, a cross-coil movement includes crosswise arranged spools that are secured to each other and journalled for rotation within a non-homogeneous magnetic field. Three leads in the form of gold bands serve to feed current to the movement 16. The output or indication of the movement 16 is proportional to the quotient of the current of both spools. For instance, if two thermometers 5 and 6 (see Fig. 6) are connected to the movement 16, and current feed from a single source 18, then the ratio of the currents corresponds to the ratio of the resistances and accordingly the indication or output of the movement 16 corresponds to the ratio of the temperatures. If the tempratures are equal to each other, then the movement 16 will be in neutral position; however, if for example the thermometer of the upper branch is cooler than that of the lower branch, then the indicator moves to the left, while conversely when the upper thermometer is hotter than the lower the indicator would move to the right.

This type cross-coil movement is well suited for comparing two temperatures because it will always assume a neutral position when both temperatures are equal, irrespective of the actual temperature values.

In the illustration of Fig. 11, the cross-coil movement 16 is combined with a chopper-bar control in a single housing 15. Below the indicator 61 of the movement 16 there is mounted movably a bar 60. The bar includes an extension that acts as a cam follower for a cam 59 that is driven from a motor 58. The bar 60 moves in opposite directions perpendicular to that of the indicator 61. Accordingly, when the cam 59, during its rotation, presses the cam follower upwardly, the bar 60 will abut against the indicator 61 and will take it along in the upward movement. If the indicator 61 at that instant has been at the left below a pressure element 62, then the latter will also be moved upwardly closing a switch 66. If, on the other hand, the indicator 61 had been moved to the right, it will cause during the upward movement induced by the bar 60 to press upwardly a pressure element 63 to close a switch 67. The cam 59 has a stepped circumference for stepwise raising of the bar 60, and similarly the pressure elements 62 and 63 are stepped in such a manner that with increasing displacement of the indicator 61, the period of closing of one of the switches 66 or 67 will correspondingly increase. As evident from Fig. 11, if the indicator 61 is in the netural central position, both switches 66 and 67 will remain open.

The motor 58 that drives the cam 59 is controlled from a switch 31. On the same shaft on which there is mounted the cam 59, there is also mounted a nose 64 which opens and closes a switch 65 completing a holding circuit for the motor 58. After each full revolution of the shaft of the motor 58, the nose 64 will open the switch 65 to stop the motor 58. Thus, the motor 58 is started by the action of the contact 31 but brought to a stop at the end of a full revolution of the cam 59.

The sets of contact terminals 27, 28, 29, 30, 31, 32 and 33 are operated by the drum 13. The portion of the cam of the drum 13 shown in Fig. 11 corresponds to the instant II shown in Fig. 3. The resistance thermometers 5 and 6 are connected to the cross-coil movement 16 by means of the terminal 27. The indicator 61 will be displaced in accordance with the temperature ratio, and exactly at the time instant II the contact 31 will operate the motor 58. If, as shown in Fig. 2, the mean temperatures of the regenerators are equal to each other, then the measured temperatures are equal to each other at that instant; the indicator 61 will be in the central neutral position, and neither of the switches 66 or 67 will be closed.

However, if the mean temperatures of the regenerators are the same, as shown in Fig. 3, then the measured temperatures are different from each other at the instant II. Depending on the direction of indication movement of the indicator 61 one of the switches 66 or 67 will be closed; the length of time of that closure depends on the extent of deviation of the indicator 61 from the neutral position.

The switches 66 and 67 are connected, by means of the terminals 27 and 30, to the magnets 49 and 50; upon closing one of said switches 66 or 67, one of the magnets 49 or 50 will be operated to adjust the part 14a of the drum 14. In the case illustrated in Fig. 3, the part 14a would be adjusted in the direction of its rotation so that the next switching would occur at the normal assigned instant IV but ahead of time at the instant III; by this adjustment, the previously existing temperature deviations will be corrected.

Figure 4:
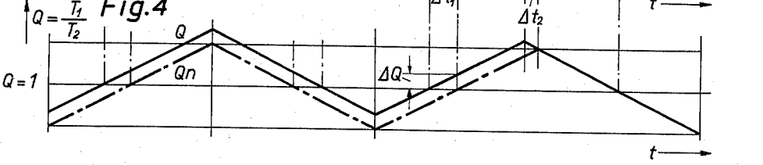

In Fig. 4, there is shown a graph of the values indicated by the cross-coil movement 16, namely of the temperature quotient $Q = T_1/T_2$. A normal operation (indicated in dot and dash lines) $Q_n$ at the instant II will equal 1 (one), which means that the movement 16 will be in neutral position. At the position shown in Fig. 3, the quotient Q at the instant V deviates for the values delta Q from the normal quotient value $Q_n$. This deviation of indication, imparted to the indicator 61 causes the aforementioned shifting in the instant of switching.

The sequence of measurement of the two pairs of regenerators of the installation shown in Fig. 1, is illustrated in Fig. 5. For the regenerator pairs with the resistance thermometers 5 and 6, the measurement takes place at the instant VIII, while for the pair of regenerators with the thermometers 7 and 8, the measurement takes place at the instants VI and X. In the first of these cases, the terminals 27 will connect the thermometers 5 and 6 to the movement 16 and connect the magnets 49 and 50 with the switches 66 and 67. In the second case, the contact terminals 28 will connect the thermometers 7 and 8 to the movement 16 and the magnets 51 and 52 to the switches 66 and 67. In this manner, each pair of regenerators is measured once during each switching period, and deviations in temperatures will be adjusted by shifting the switching instant.

There remains to be described the manner in which the adjustment of the drum 14 is returned to the initial position after the switching of the regenerators. This return is necessary so that at the next succeeding measurement a new adjustment can be made starting from the initial position.

When the bracket 42 is moved from its neutral central position (Fig. 9) it will close one of the switches 54 or 55 (Fig. 10); similarly, the bracket 42a will close one of the switches 56 or 57. As shown in Fig. 11, shortly before measuring the thermometers 5 and 6, the terminals 32 of the drum 13 will be closed. If the bracket 42 (or 42a), owing to the preceding measurement is in position with the neutral position, there will be closed one of the contacts 54 or 55, and one of the magnets 49 or 50 will be in operation and the gear 44 be in mesh with one of the gears 46 or 47. The bracket 42 will be moved, this time in direction towards the neutral position until upon reaching that position the previously closed switch 54 or 55 will be interrupted, and the bracket 42 come to rest in the neutral position. A similar operation is in connection with the bracket 42a, where the switches 56 and 57 as well as the terminals 33 on the drum 13 cause the return of the bracket 42a to this neutral position.

Figure 8:
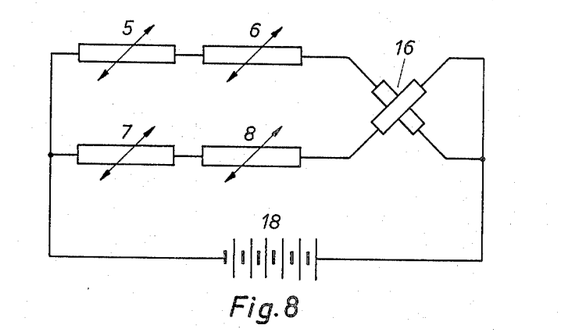

The comparison of the mean temperatures of both pairs of regenerators, from which there depends the adjustments of the throttle valve 19, is carried out by means of the same regulating instrument. When the terminal 30 is actuated by the drum 13, then all four thermometers are connected to the movement 16, as shown in Fig. 8. In upper branch there are the thermometers 5 and 6 of one pair of regenerators, while the thermometers 7 and 8 of the other pair are in the lower branch. Thus, the thermometers of each pair of regenerators are connected in series, and the resulting sum of resistances corresponds to the temperatures of the corresponding pair of regenerators. Any deviation of a single thermometer is compensated for, as in each branch one thermometer will be cooled for the same value as the other one will be heated.

The indication movement of the indicator 61 corresponds to the quotient of the mean temperatures of both pairs of regenerators. The operation by the bar 60 causes the closing of one of the switches 66 or 67 in dependency of the direction and magnitude of the indication by the indicator 61, which will be transferred by the two lower connectors of the terminals 30 to the motor 20. The motor 20 adjusts, by means of a transmission gearing, the throttle valve 19, either towards opening or towards closing, depending on the contacts made.

This regulation is made between the measuring of the individual regenerators, as shown in Fig. 5, between the instants VII and IX.

In the modification shown in Fig. 12, there is illustrated an embodiment of a regulating mechanism in which the positioning of the bracket 42, which initiates the instant of the switching, is done in a somewhat different manner as that shown and described in connection with Fig. 11. There is again a cross-coil movement 16, but there is provided an indicator 68 that directly makes contact with the terminals 66 or 67 for switch closing. The terminal 67 is so arranged, that the indicator 68 will make contact therewith when the movement 16 is in the neutral central position, that means when the measured temperatures are equal. As shown in Fig. 3, the instant I at which the temperature $T_1$ equals the temperature $T_2$ is shifted towards the normal instant II in such a manner that the shifting increases with an increase in the deviation from the mean temperature. This shifting delta $t_1$ is twice the value of delta $t_2$ the time interval for which the succeeding switching must be shifted, in order that the temperatures are again equalized.

When the movement 16 is connected with the thermometers, then the indicator 68 will move slowly towards the terminal 67, reaching the same when the temperature equalization has been obtained. The instant of the making of contact between the indicator 68 and the terminal 68 will deviate from the normal instant increasingly with the increasing difference between the mean temperatures. This effect is utilized for changing the position of the bracket 42, and therefore for the shifting of the switching instant, as follows:

The initial position of the bracket 42, in contrast to that illustrated in Fig. 9, is not in the center as it was in connection with Fig. 11. Instead, the bracket 42, by means of the switch 55 and magnet 50 will be moved before each measurement, into a position in which the switching III will occur ten seconds later than at the normal instant IV. The start of each measurement, as controlled by the cam of the terminals 27 is moved to occur twenty seconds before the normal instant II of contact making, and the termination to be twenty seconds after the normal instant. The transmission between the shaft 21 and the bracket 42 is so selected that the shifting period delta $t_2$ of the switching instant is achieved by the operation of one of the magnets throughout a duration twice as long. For example, if the magnet 49 is operated for twenty seconds, then the switching is shifted for ten seconds. If during the measurement the mean temperatures are normal, then contact of the regulator is made at the instant II, and the magnet 49 will remain operated for twenty seconds, until interrupted by the terminals 27. This results in a shifting of the switching instant for ten seconds. However, if the difference between the initial position and the central position corresponded to ten seconds, the switching actually will take place at the normal instant IV.

In the event that contact is made, for instance, twenty seconds after the instant II, owing to a difference in the mean temperatures, then the magnet 49 will not be operated as at that instant interruption is caused between terminals 27. The bracket 42 will remain in its initial position, and the switching will materialize ten seconds later than normal.

In the event that contact is made, for instance, twenty seconds before the instant II, then the magnet 49 will be operated altogether for forty seconds and will cause a shifting of the switching instant for twenty seconds as compared to the initial position; this means, switching will take place ten seconds before the instant IV.

If the displacement of the bracket 42 during the measurement takes place in one direction only, there is but a single of the magnets 51 or 49 contacted to the regulating instrument. The other magnet, 52 or 50, serves for the return of the bracket 42 to the initial position, and is controlled by the switch 55 (for the contact 42, or switch 57 for the contact 42a) as well as the terminals 32 and 33 of the drum 13.

The regulation of the apportioning of the air among both pairs of regenerators by means of the throttle valve 19 and motor 20 remains unchanged as compared to the showing of Fig. 11. The ratio of the mean temperatures of both pairs is measured from the movement 16 at the making of contact of terminals 30. If said ratio deviates from the normal value, then contact will be made between the indicator 68 and either the terminal 66 or the terminal 67, and the motor 20 will run in the corresponding direction until interruption is caused by the terminals 30.

The advantage of this modification as compared to the embodiment of Fig. 11 is that the shifting of the instant of switching is stepless in corespondence to the deviation of the mean temperatures.

Figure 7:
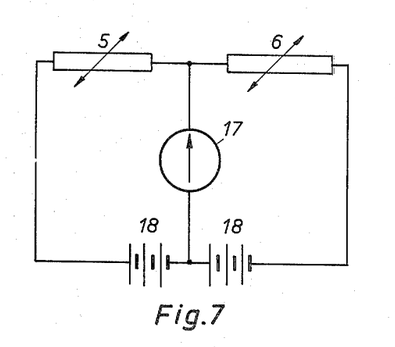

It should be pointed out that for the comparison of two temperature values measured with resistance thermometers it is not necessary to use a cross-coil movement of the type shown at 16. Instead, the thermometers may be connected in circuit with a measuring bridge, for instance as shown in Fig. 7, utilizing a dial instrument 17. Assuming that both sources 18 are equal, the measuring bridge will be without current when the resistances 5 and 6 are equal to each other. If the value of resistance 5 is larger than that of 6, the measuring instrument will deviate towards one side, and conversely to the other side when the values are reversed, proportionately to the difference in values.

When the installation consists of more than two pairs of regenerators operating in opposite phase (such an installation has not been illustrated) such, for example, as three pairs A, B and C, then control throttle valves are disposed in the fresh gas feeds for pairs A and B and at first the temperatures of A and C, then those of B and C are compared and the associated throttles are adjusted in accordance with the result of the measurements. When four pairs of regenerators A, B, C and D are provided, the pairs A and B and then the pairs C and D are adjusted or compensated with respect to each other. Thereafter the ratio or the difference of the mean temperatures between the pairs $(A+B)$ and $(C+D)$ is utilized for compensating their temperatures by means of the gas distribution. When two or more pairs of regenerators are operated under different operating conditions as, for example, at different pressures in the fresh gas or in the residual gas, different entrance temperatures of one type of gas or lateral removal or supply of a partial amount of gas in one pair of regenerators, the temperatures which have to be compensated may be different for the individual pairs of regenerators. Even under such conditions control of the temperatures is possible in the manner described hereinabove. In that case the ratio or the difference of the mean temperatures to be maintained as the normal value of the pairs does not have a value of unity or zero but a different, predetermined, fixed value. The contacts, the actuation of which initiates a change of the gas distribution by way of the adjustment throttle valves are now disposed at both sides of the scale of the instrument adjacent to this predetermined value so that this predetermined value becomes the normal value.

The principle of the control method of the invention is the same for all control methods or devices described herein.

Two regenerator units (either individual regenerators or pairs of regenerators) between which a temperature compensation is easily possible by adjustment or control of the gas distribution are compared directly with each other by measuring their temperatures and obtaining the ratio of difference of their temperatures. Thus, the absolute value of the temperature, which is of no interest for the control, disappears. The deviation of the measured temperatures from the desired value controls the distribution of the gas either directly by changing the amount of gas per unit of time (by adjusting the throttle valve) or, if the amount of gas per unit of time is constant, by changing the time during which the gas flows through the regenerators (by altering the change-over point).

Since certain changes may be made in the above process and device and different embodiments of the invention could be made without departing from the scope thereof, it is intended that all matter contained in the above description or shown in the accompanying drawing shall be interpreted as illustrative and not in a limiting sense.

Having thus described the invention, what I claim as new and desire to be secured by Letters Patent, is as follows:

1. A method for separating a gas mixture in regenerator units consisting of individual regenerators and pairs of regenerators comprising supplying said gas mixture into one regenerator of at least one pair of filler loaded pairs of regenerators, cooling said gas mixture during its flow through said regenerator, contemporaneously flowing a mixture component in an opposite flow direction to that of said gas mixture through the second regenerator of said pair of regenerators and heating the same, alternatingly changing-over the cooling of the gas mixture and the heating of its component from one to the other regenerator after predetermined periods of time by synchronously operated change-over means, measuring the temperature variation during each of said time periods in the interior of said regenerators, automatically controlling said change-over step by shifting the instant thereof to maintain the mean temperature of the regenerators substantially constant, measuring said temperatures at predetermined instants fixed within each of said periods of time and utilizing the deviations of said combined temperatures from a desired predetermined value to vary the instant of reversal succeeding the instant of measuring said temperatures.

2. A method for separating a gas mixture in regenerator units consisting of individual regenerators and pairs of regenerators comprising supplying said gas mixture into one regenerator of at least one pair of filler loaded pairs of regenerators, cooling said gas mixture during its flow through said regenerator, contemporaneously flowing a mixture component in an opposite flow direction to that of said gas mixture through the second regenerator of said pair of regenerators and heating the same, alternatingly changing-over the cooling of the gas mixture and the heating of its component from one to the other regenerator after predetermined periods of time by synchronously operated change-over means, measuring the temperature variation during each of said time periods in the interior of said regenerators, automatically controlling said change-over step by shifting the instant thereof to maintain the mean temperature of the regenerators substantially constant and utilizing the deviations of the instant within each of said periods of time when said combined temperatures have a predetermined value to vary the instant of reversal succeeding the instant of measuring said temperatures.

References Cited in the file of this patent

UNITED STATES PATENTS

| | | |
|---|---|---|
| 1,890,646 | Frankl | Dec. 13, 1932 |
| 1,948,779 | Abbott et al. | Feb. 29, 1934 |
| 2,083,732 | Morre et al. | June 15, 1937 |
| 2,084,987 | Borchardt et al. | June 29, 1937 |
| 2,138,685 | Altenkirch | Nov. 29, 1938 |
| 2,379,518 | Hall | July 3, 1945 |
| 2,535,902 | Dailey, Jr. | Dec. 26, 1950 |
| 2,545,194 | Colburn et al. | Mar. 13, 1951 |
| 2,677,252 | Rice et al. | May 4, 1954 |